US011881899B1

United States Patent
Zhang et al.

(10) Patent No.: US 11,881,899 B1
(45) Date of Patent: Jan. 23, 2024

(54) SYSTEMS AND METHODS FOR CARRIER PHASE RECOVERY

(71) Applicant: CABLE TELEVISION LABORATORIES, INC., Louisville, CO (US)

(72) Inventors: Haipeng Zhang, Broomfield, CO (US); Mu Xu, Broomfield, CO (US); Zhensheng Jia, Superior, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/827,581

(22) Filed: May 27, 2022

Related U.S. Application Data

(60) Provisional application No. 63/193,660, filed on May 27, 2021.

(51) Int. Cl.
*H04B 10/61* (2013.01)
*H04L 25/49* (2006.01)

(52) U.S. Cl.
CPC ....... *H04B 10/6165* (2013.01); *H04B 10/613* (2013.01); *H04L 25/4917* (2013.01)

(58) Field of Classification Search
None
See application file for complete search history.

(56) References Cited

U.S. PATENT DOCUMENTS

| | | | | |
|---|---|---|---|---|
| 9,077,508 B2* | 7/2015 | Koike-Akino | ...... | H03M 13/353 |
| 9,473,250 B2* | 10/2016 | Koike-Akino | ........ | H04L 1/0055 |
| 9,729,362 B1* | 8/2017 | Ralph | ................. | H04L 27/0014 |
| 9,735,991 B1* | 8/2017 | Ralph | ................. | H04L 27/0008 |
| 10,873,493 B2* | 12/2020 | Xu | ........................ | H04L 27/361 |
| 11,626,928 B2* | 4/2023 | Su | ...................... | H04B 10/6163 |
| | | | | 398/158 |

* cited by examiner

*Primary Examiner* — Jai M Lee
(74) *Attorney, Agent, or Firm* — Josh C. Snider; Snider IP

(57) ABSTRACT

A receiver is provided for processing an input signal from a communication network. The receiver includes a processor and a memory configured to store computer executable instructions, which, when executed by the processor, cause the processor to (i) receive an input data signal including digital bit information, (ii) code the input data signal into a plurality of multi-level symbols, (iii) map the plurality of multi-level symbols into a plurality of constellation points in the phase domain, (iv) execute a first phase recovery subprocess on the plurality of constellation points to recover a first carrier phase of the input signal, (v) implement a Gaussian mixture model (GMM) on the recovered first carrier phase to generate an enhanced recovered carrier phase, and (vi) process the enhanced recovered carrier phase with a second phase recovery subprocess to reduce distortion from the input signal.

20 Claims, 9 Drawing Sheets

SYSTEMS AND METHODS FOR CARRIER PHASE RECOVERY

CROSS REFERENCE TO RELATED APPLICATIONS

This application claims the benefit of and priority to U.S. Provisional Patent Application Ser. No. 63/193,660, filed May 27, 2021, the subject matter of which is incorporated herein by reference in its entirety.

BACKGROUND

The field of the disclosure relates generally to communication networks, and more particularly, to innovative signal processing techniques for digital transport over a variety of communication systems.

Recent, continuous growth over the past decade in data intensive applications and services, such as high-definition video-on-demand, residential data services, cloud computing/storage, Internet of Things (IoT), "Big Data," business services, cellular connectivity, etc., has led to a related continuous increase in the overall traffic volume demanded and delivered across today's communication networks. The ever-increasing demand for high-speed data and service bandwidth are predicted to grow to multi-gigabits-per-second (Gb/s) for residential users, and well over 10-Gb/s for business markets in digital communication networks of the near-future.

To support this demand for higher data rate and provide multi-gigabits/s speed per subscriber, network operators are increasingly utilizing fiber and optical access technologies. For example, conventional short-distance implementations are known to deploy optical access networks utilizing intensity modulation direct detection (IM-DD) technology to mitigate the overall cost and complexity of the network in point-to-point (P2P) and passive optical network (PON) links. However, although IM-DD technology has evolved significantly over the last two decades, IM-DD-based network solutions suffer from significant limitations with respect to modulation bandwidth, transmission distances, PON split ratio, and poor receiver sensitivity.

As the PON evolves towards 100 Gb/s and higher data rates, there is a desire in the field to develop solutions based on coherent technology, and particularly with respect to the optical access network paradigm. In comparison with IM-DD-based networks, coherent technology provides significantly superior performance, due to its high-sensitivity reception, large split ratios for PONs, inherent capability for frequency selectivity, and linear field detection enabling full linear channel impairment compensation (e.g., chromatic dispersion (CD), polarization mode dispersion (PMD), etc.). Additionally, coherent technologies support exceptionally high data throughput over a longer reach deployments (e.g., greater than 50 km), and efficiently utilize spectral resources and enable future network upgrades through the use of multi-level advanced modulation formats. Recently, coherent technology solutions developed by the present inventors have been proposed as the key technology for the next generation (NG) single-wavelength 100-Gb/s PON.

However, despite such benefits, the high complexity of conventional coherent transceivers and receivers renders coherent technology much more costly to implement than IM-DD technology. In particular, in a conventional PON-based optical access network, the cost requirements for an optical network unit (ONU) are more stringent than for a counterpart optical line terminal (OLT). In a point-to-multipoint (P2MP) architecture, a plurality of ONUs may be served by a single OLT, thereby increasing the cost disparity arising from coherent technology implementation. This disparity has heretofore presented a significant challenge to introducing conventional coherent solutions from the long-haul and metro paradigms into the different paradigm of the optical access network.

The cost of conventional coherent technology systems has been dominated by complex optical and opto-electronic components, such as high-performance tunable lasers and local-oscillators (LOs), high-speed modulators, digital signal processing (DSP) chips, polarization optics, etc. The present inventors, in related U.S. Pat. No. 10,944,478, issued Mar. 9, 2021, introduced innovative solutions to significantly reduce the cost of coherent optical components and systems by providing novel optical injection locking (OIL)-based architectures and techniques for optical full-field transmitter (OFFT). The subject matter of this previous patent incorporated herein by reference, and is described further below with respect to FIG. 1.

FIG. 1 depicts a comparative illustration 100 of conventional transmitters 102, 104. In this example, transmitters 102, 104 depict simplified schematic diagrams of coherent transmitters according to U.S. Pat. No. 10,944,478. These recent improved transmitters by the present inventors provide multi-level signal modulation and equalization in the phase domain, which significantly reduce device complexity and insertion/modulation loss in comparison with conventional transmitters based on Mach Zender modulators (MZMs) and in-phase/quadrature (I/Q) modulators.

In this example, transmitter 102 includes an electro-absorption (EA) modulator 106 in communication with a laser or laser diode (LD) source 108 and a drive signal 110 (a Pulse Amplitude Modulation (PAM)-4 signal, in this example), and is illustrative of an IM-DD transmission system. Transmitter 104 is similar to transmitter 102, but utilizes a phase modulator 112 instead of an EA modulator. Phase modulator 112 though, is similarly in communication with a laser or laser diode (LD) source 114 and a drive signal 116 (also a PAM-4 signal, in this example), and is thus illustrative of a coherent transmission system. For ease of explanation, phase domain coherent signal transmitter 104 is described only with respect to a single frequency laser from source 114 provided to optical phase modulator 112.

The difference between the IM-DD-based and coherent-based approaches is readily apparent by viewing the resulting modulator outputs from each of transmitters 102, 104 in the phase domain. That is, as illustrated in phase domain plot 118, a signal output 120 from EA modulator 106 produces only one-dimensional in-phase (I) component results in the phase domain. In contrast, as illustrated in phase domain plot 122, for a similar laser source and drive signal, a signal output 124 from phase modulator 112 produces a full constellation of two-dimensional results in the phase domain, which have both I and Q components, namely, a Quadrature Phase Shift Keying (QPSK) coherent signal.

Nevertheless, real-world operation of these simplified coherent transmitter embodiments does not always experience the same clean results as the simplified coherent transmitter model depicted in FIG. 1. Accordingly, there is a further need in the field to develop improved carrier phase estimation and recover techniques that do not further increase the overall hardware cost and complexity.

SUMMARY

In an embodiment, a receiver is provided for processing an input signal from a communication network. The receiver includes a processor and a memory configured to store computer executable instructions, which, when executed by the processor, cause the processor to (i) receive an input data signal including digital bit information, (ii) code the input data signal into a plurality of multi-level symbols, (iii) map the plurality of multi-level symbols into a plurality of constellation points in the phase domain, (iv) execute a first phase recovery subprocess on the plurality of constellation points to recover a first carrier phase of the input signal, (v) implement a Gaussian mixture model (GMM) on the recovered first carrier phase to generate an enhanced recovered carrier phase, and (vi) process the enhanced recovered carrier phase with a second phase recovery subprocess to reduce distortion from the input signal.

In an embodiment, a method is provided for performing carrier phase recovery on an input digital signal from a remote phase modulator-based coherent transmitter. The method includes steps of (i) performing coarse phase recovery on the input digital signal to recover a coarse carrier phase from the input digital signal, (ii) classifying phase domain symbols from the recovered coarse carrier phase with an estimated cluster index to generate a plurality of constellation clusters in the phase domain, and (iii) performing fine phase recovery on the plurality of constellation clusters to obtain a precision phase recovery signal.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
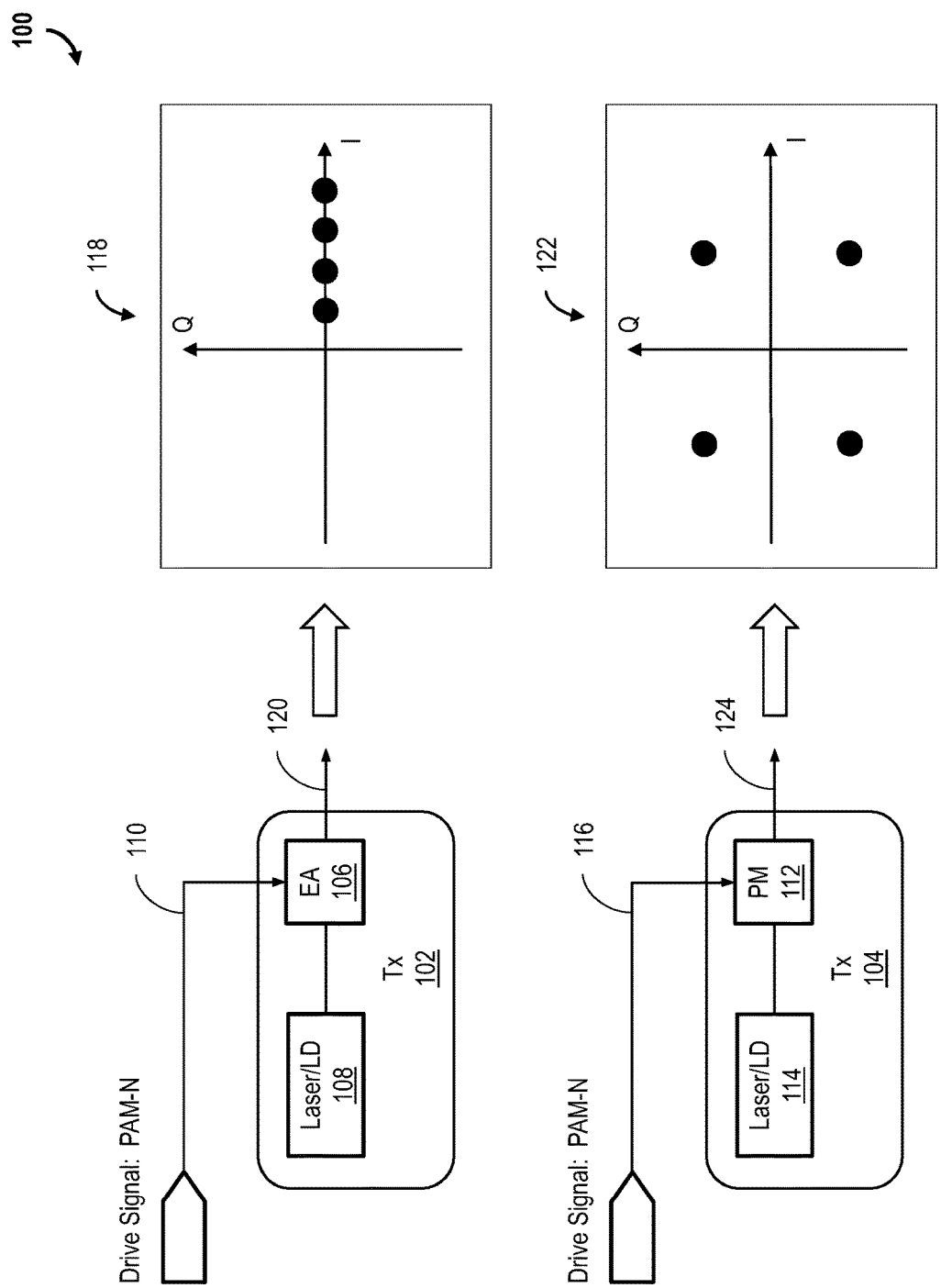
FIG. 1 depicts a comparative illustration of conventional transmitters.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object-oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the times of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, unless specified to the contrary, "modem termination system," or "MTS" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/ modem, a satellite modem, etc.

As used herein, the term "transceiver," unless specified otherwise, refers to a P2P or P2MP coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The person of ordinary skill in the art will understand that the term "wireless," as used herein in the context of optical transmission and communications, including free space optics (FSO), generally refers to the absence of a substantially physical transport medium, such as a wired transport, a coaxial cable, or an optical fiber or fiber optic cable.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and thus the "distance" between nodes may be physical or perceptual. A hyperscale datacenter may include several performance optimized datacenters (PODs), and each POD may include multiple racks and hundreds and thousands of computing and/or storage devices.

Several embodiments are described herein with respect to various components that may be found in conventional cable, wireless/Wi-Fi, and/or optical networks, which may include, without limitation, an ONT or OLT, and an ONU, and may utilize optical protocols such as Data Over Cable Service Interface Specification (DOCSIS), Ethernet PON (EPON), Radio Frequency over Glass (RFoG), Gigabit PON (GPON), and/or Satellite Internet Protocol, without departing from the scope of the embodiments herein.

Communication systems according to the present embodiments may be further configured for X-hauling traffic, satellite operator communications, MIMO communications, microwave communications, and both short- and long-haul coherent optical communications. As used herein, the terms "xHaul" or "X-hauling" refers to any one, or a combination, of front-hauling, back-hauling, and mid-hauling.

The embodiments described herein provide innovative systems and methods for achieving additional improved and simplified carrier phase estimation (CPE) and carrier phase recovery (CPR) for coherent optics in the access network paradigm, as well as for communication systems in general. In an exemplary embodiment, the present systems and methods leverage coherent optics technologies, and with respect to P2P or P2MP systems and communication links, to significantly improve communication systems in general, as well as the cable access network, by providing lower-complexity techniques for reliably obtaining CPE and CPR.

In an exemplary embodiment, an innovative two-stage CPE process is introduced, which further improves the precision and effectiveness of phase recovery processing. Such CPE processing techniques may, for example, build upon the previous achievements by the present inventors and specifically target the newer phase modulator-based coherent transceiver architectures incorporated by reference herein. In one example, a first stage of a two-stage CPE process performs coarse phase recovery, and a second stage of the two-stage CPE process fine tunes the phase to remove residual phase noise. In the exemplary embodiment, the coarse phase recovery results from the first stage are subjected to a pre-decision step prior to fine tuning by the second stage. The enhanced pre-decision processing may, for example, implement a Gaussian mixture model (GMM) to enhance the pre-decision processing.

For ease of explanation, the following processing embodiments are described with respect to use of a fourth power receiver of claim 2, wherein the plurality of constellation points represents a quadrature phase shift keying (QPSK) coherent signalalgorithm for phase estimation and recovery processing. The person of ordinary skill in the art, however, will understand that this description is provided by way of example, and not in a limiting sense. Other phase processing algorithms, including but not limited to blind phase search (BPS), may be utilized without departing from the scope herein. Advanced systems, methods, and algorithms for CPE and CPR are described in further detail in co-pending U.S. patent application Ser. No. 17/077,906 to the present inventors, filed Oct. 22, 2020, the subject matter of which is incorporated herein by reference in its entirety.

The exemplary embodiments described herein may be implemented with respect to receivers/coherent receivers operating at 100 Gb/s and/or 200 Gb/s. However, the person of ordinary skill in the art will appreciate that such operating parameters are offered by way of example, and not in a limiting sense. Exemplary structural and algorithmic functionality of a coherent optical receiver is described in further detail in co-pending U.S. patent application Ser. No. 16/370,873, filed Mar. 29, 2019, the subject matter of which is also incorporated herein by reference.

The innovative principles described herein are also broadly applicable to access networks, PONs, and coherent optics systems operating at various transmission speeds presently in use, and are fully adaptable to future-network transmission speeds and operating parameters as the demand for increased speed and bandwidth continues to grow. The following examples may also be implemented with respect to FSO or fiber links of up to 50 km. However, the person of ordinary skill in the art will further appreciate that the present techniques support links of up to 80 km, 120 km, or greater in some circumstances.

Figure 2:
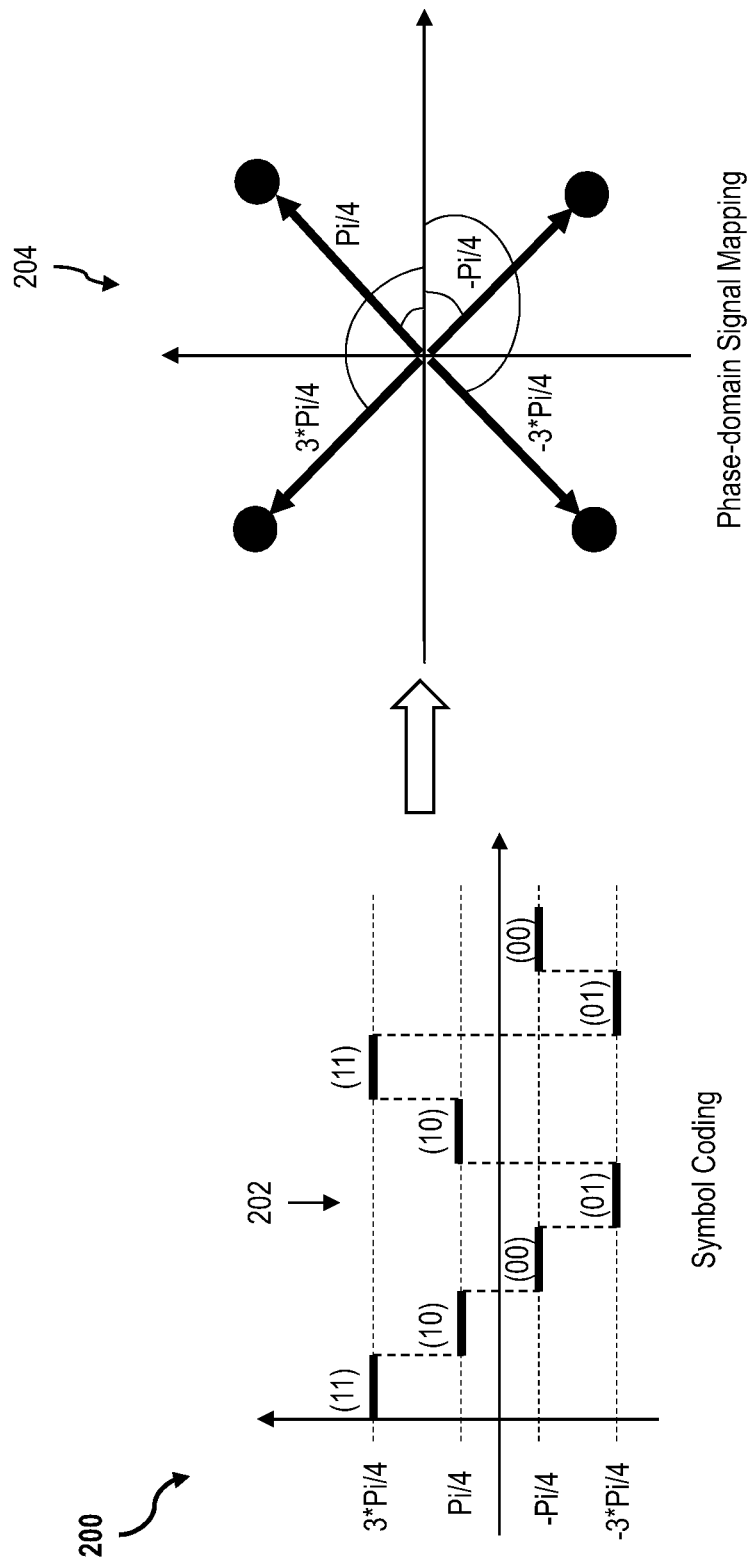
FIG. 2 is a graphical illustration depicting a phase domain mapping principle that may be implemented with one or more of the embodiments described herein.

FIG. 2 is a graphical illustration depicting a phase domain mapping principle 200 that may be implemented with one or more of the embodiments described herein. In the exemplary embodiment depicted in FIG. 2, a multi-level signal 202 (e.g., coded symbols, in this example) is mapped into a phase domain signal 204. In some embodiments, mapping of multi-level signal 202 into the phase domain may be performed by (i) a discrete hardware unit (e.g., having a processor and a memory), (ii) through software programming or computer-executable instructions executed by a processor of a relevant transmitter, receiver, transceiver, or other element of the particular communication network or system, or (iii) by some combination of dedicated hardware and software.

For ease of illustration, and not in a limiting sense, the following examples are described with respect to multi-level signal 202 being a 4-level PAM-4 signal. The person of ordinary skill in the art will understand, however, that other multi-level signals may be used with respect to the present embodiments without departing from the scope thereof.

In exemplary operation of principle 200, input bit information (e.g., [1110000110 . . . ]) may be coded as PAM-4 symbols of a multi-level signal 202 and, once so encoded, the PAM-4 symbols of multi-level signal 202 may be mapped to specific phase values of phase domain signal 204. In the exemplary embodiment depicted in FIG. 2, the PAM-4 symbols of multi-level signal 202 are mapped as phases of [+3pi/4, +pi/4, −pi/4, −3pi/4]. Accordingly, as depicted in phase domain signal 204, the mapped optical carrier in this example is modulated as a corresponding 4PSK/QPSK signal. That is, the drive signal for phase modulation will have four levels, which is mapped as four QPSK optical phases of phase domain signal 204.

In a similar manner, the operational principle of module 4500 may be effectively applied for any N-level signal. For example, after PAM-N mapping or coding in the electrical domain of an N-level signal 202N (not separately shown), the corresponding optical carrier may be modulated as an N-PSK signal 204N. That is, the corresponding drive signal for phase modulation will have N levels, and therefore be mapped as N optical phases of N-PSK phase domain signal 204N. The versatility of the present techniques thus enables the mapping and coding processing to be efficiently executed by either a respective phase modulator on the transmitter-side, or by a demodulator on the receiver-side.

In the exemplary embodiment depicted in FIG. 2, phase domain signal 204 is illustrated for an ideal case having the four-level PAM-4 data of multi-level signal 202 mapped to the phase domain of phase domain signal 204 at +3pi/4, +pi/4, −pi/4, and −3pi/4 to form a QPSK signal. However, in real-world scenarios, due to the bandwidth limitation and non-ideal frequency response of the relevant electrical signal driver, phase modulator, and electrical cables, inter-symbol-interference (ISI) will be present in the PAM-4 signal, and which will also be remapped to the QPSK signal in phase domain, as described further below with respect to FIG. 3.

Figure 3:
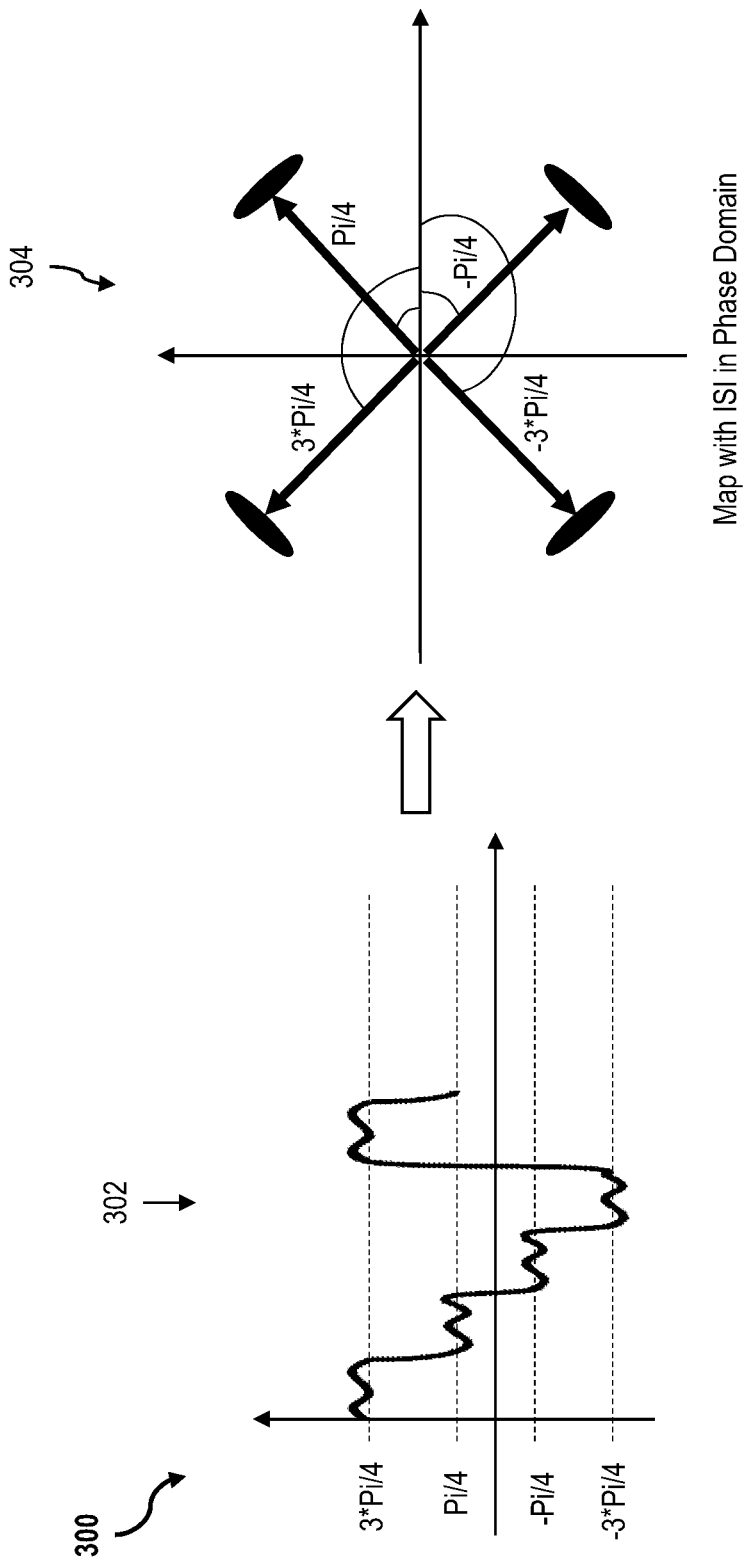
FIG. 3 is a graphical illustration of the phase domain mapping principle depicted in FIG. 2, with inter-symbol interference present in the phase domain.

FIG. 3 is a graphical illustration 300 of phase domain mapping principle 200, FIG. 2, with ISI present in the phase domain. More particularly, according to principle 200, input bit information is coded as PAM-N symbols of a multi-level signal 302 (e.g., [+3pi/4, +pi/4, −pi/4, −3pi/4], for the PAM-4 example depicted in FIG. 3). However, the ISI present in multi-level signal 302 results in a non-flat response at each level of multi-level signal 302, and a less steep rise and fall between each adjacent level. The ISI effect is even more apparent viewed in the phase domain of corresponding mapped phase domain signal 304, where the distributed points of the phase domain constellation may be seen to be considerably flattened, in comparison with the ideal case of phase domain signal 204 shown in FIG. 2.

For ease of explanation, the embodiment depicted in FIG. 3 is described only with respect to distortion introduced by ISI. The person of ordinary skill in the art will understand that phenomena such as chirp and/or carrier density change of the laser source may also add phase distortion and rotation to the generated coherent signal. The following embodiments therefore provide several innovative techniques to correctly modulate the optical signal for a specific constellation, and thereby correct the phase of the optical signal thereof.

As described above, it is known in conventional coherent digital signal processing (DSP) to perform carrier phase estimation (CPE) using such algorithms as (i) fourth power Viterbi to Viterbi (VV) algorithm, and (ii) and blind phase search (BPS). However, although VV- or BPS-based CPE techniques are considered very effective for some conventional coherent signal processing scenarios, such conventional techniques are considerably limited in their ability to affect the phase domain coherent signal transmitter of the present embodiments, and are not sufficiently capable to handle the special phase domain noises exhibited through use of the present phase domain coherent signal transmitter.

These conventional limitations though, are solved according to the innovative systems and methods herein, which provide an enhanced two-stage CPE process uniquely suited for phase modulator-based coherent transceivers that significantly improve the precision and effectiveness of phase recovery. One such exemplary CPE processing technique is described further below with respect to FIG. 4.

Figure 4:
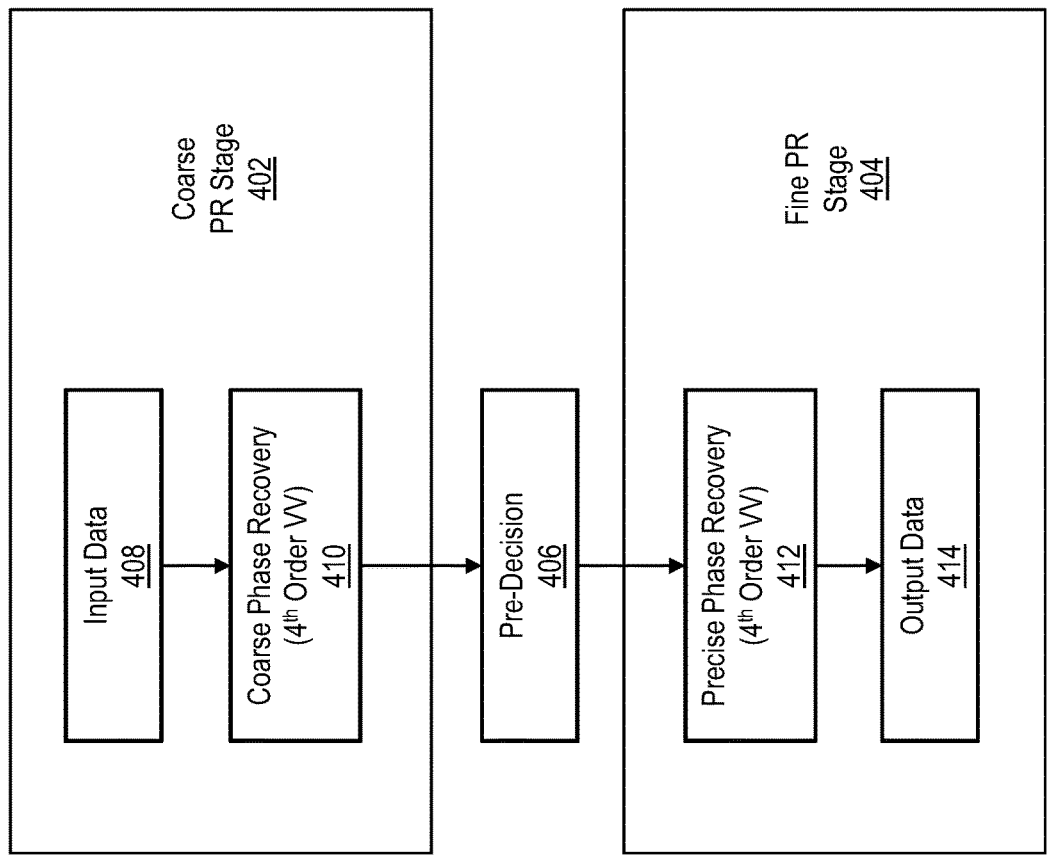
FIG. 4 is a schematic illustration depicting an exemplary carrier phase estimation process, in accordance with an embodiment.

FIG. 4 is a schematic illustration depicting an exemplary carrier phase estimation process 400. In the exemplary embodiment depicted in FIG. 4, process 400 includes a first subprocessing stage 402 for performing coarse phase recovery (PR) and a second subprocessing stage 404 for fine tuning the coarse phase recovered in first subprocessing stage 402. In the exemplary embodiment, a pre-decision step 406 is performed after first subprocessing stage 402, but before second subprocessing stage 404. Pre-decision step 406 may, for example implement a Gaussian mixture model (GMM) to enhance the pre-decision capability prior to fine tuning by second subprocessing stage 404.

In exemplary operation, process 400 begins at step 408, in which first subprocessing stage 402 receives input data 408 (e.g., input bit information for multi-level signals 202, FIG. 2, 302, FIG. 3). In step 410, first subprocessing stage 402 performs coarse phase recovery on the input data received in step 408. In an exemplary embodiment of step 410, coarse phase recovery is performed based on a VV algorithm; however, as described above, this algorithm is described by way of example, and not in limiting sense. Other phase estimation/recovery algorithms (e.g., BPS, etc.) may be utilized without departing from the scope herein.

In at least one embodiment of step 410, the input data from step 408 takes its fourth power (e.g., multi-level signals 202, FIG. 2, 302, FIG. 3), followed by the fourth root to map the original constellation points on the diagonals in a half-pi region (e.g., phase domain signals 204, FIG. 2, 304, FIG. 3). From this constellation mapping, process 400 may then estimate random phase noise by tracking and taking the fourth power of the phase shift from the constellation points (e.g., a fourth order VV algorithm), and then recover the carrier phase (i.e., coarsely) by multiplying the reverse of the average estimated phase change to each data block.

After coarse phase recovery in step 410, process 400 proceeds to pre-decision step 406. In some embodiments, pre-decision step 406 may be performed at the end of first subprocessing stage 402. In other embodiments, pre-decision step 406 may be performed at the beginning of second subprocessing stage 404, or may itself constitute a separate, third subprocessing stage performed in between first and second subprocessing stages 402, 404. In an exemplary embodiment of pre-decision step 406, unsupervised learning technology based on a GMM algorithm may be adopted to label and classify all of the coded and mapped symbols with estimated cluster index into four constellation clusters in the phase domain.

After pre-decision in step 410, process 400 proceeds to step 412 of second subprocessing stage 404, in which a second CPE VV algorithm is performed on the output of pre-decision step 406 to obtain precise phase recovery of the constellation clusters. That is, by implementing the pre-decision technique described herein between the two phase recovery subprocessing stages 402, 404, process 400 is enabled to significantly improve the accuracy of CPE in comparison with conventional CPE techniques. Moreover, systems and methods according to process 200 are enabled to achieve similar improved results utilizing algorithms other than the exemplary VV algorithm described with respect to FIG. 4 (e.g., BPS-based CPE processing, etc.).

In an exemplary embodiment, process 400 may be implemented with respect to a CPE structure similar to that of co-pending U.S. patent application Ser. No. 17/077,906, as described above and incorporated by reference herein, which implements a CPE structure for 64-quadrature amplitude modulation (QAM) coherent signals that are modified for QPSK signals generated from a phase domain coherent signal transmitter. Nevertheless, the person of ordinary skill in the art will understand that the implementation examples based on QPSK signals from this co-pending application and the present application are provided by way of example, and are not intended to be limiting. The present techniques may be applied for modulation formats other than QPSK without departing from the scope herein.

Thus, in simplified terms, process 400 may be considered a two-stage CPE process having a coarse phase recovery stage (e.g., first subprocessing stage 402) followed by a precise/fine phase recovery stage (e.g., second subprocessing stage 404), with a pre-decision processing step (e.g., pre-decision step 406) included as the final step of the first, coarse phase recovery stage or the first step of the second, precise/fine phase recovery stage. Alternatively, process 400 may considered a three-stage CPE process having a first, coarse phase recovery stage (e.g., first subprocessing stage 402), followed by a second, pre-decision stage (e.g., pre-decision step 406), and then a third, precise phase recovery stage (e.g., second subprocessing stage 404). In exemplary embodiments of either two-stage or three-stage CPE processing, coarse phase recovery from the first stage may be combined with GMM-based enhanced pre-decision to fine tuning the phase and remove residual phase noise in the final stage, thereby significantly improving the CPE accuracy over conventional techniques.

Figure 5:
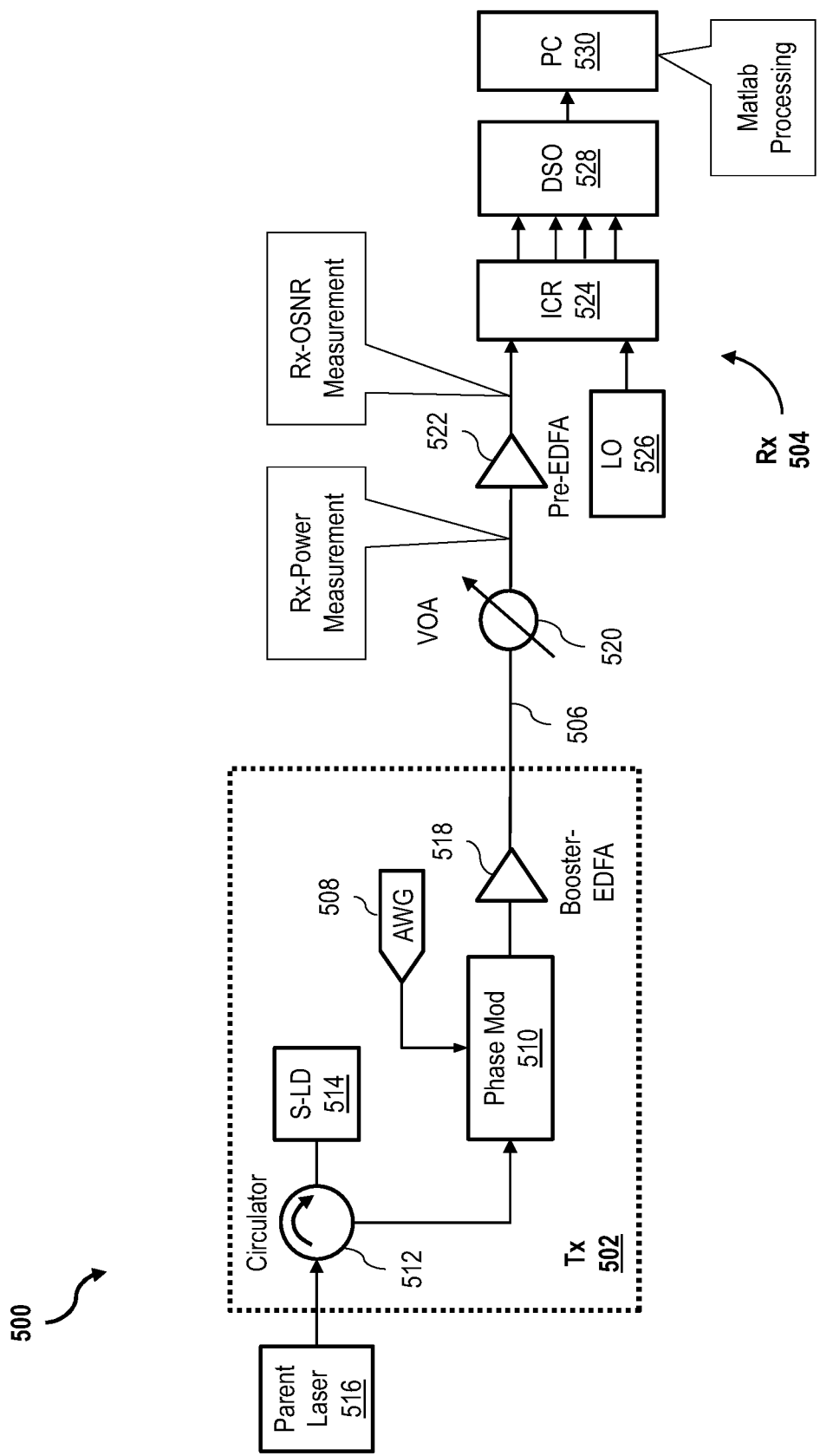
FIG. 5 is a schematic illustration of an exemplary test architecture for verifying experimental results implementing the carrier phase processing embodiments herein.

FIG. 5 is a schematic illustration of an exemplary test architecture 500 for verifying experimental results implementing the carrier phase processing embodiments herein. More particularly, test architecture 500 was implemented in a real-world experimental setup to verify proof of concept for the CPE and systems and methods described herein. At a high level of description, test architecture 500 represents a testbed for a real-world operation of a coherent optics communication network including a transmitter end 502 operably coupled to a receiver end 504 by an optical communication medium 506 (e.g., an optical fiber, in this test case).

Transmitter end 502 included an arbitrary waveform generator (AWG) 508 (e.g., including an 80 GSa/s DAC), which produced a lab-generated 12.5 GBaud PAM-4 driving signal (using an offline MATLAB code) to a single phase modulator 510. Phase modulator 510 was further coupled to an optical circulator 512 in communication with a local laser source 514 (an S-LD, in this test case) and a separate parent light source 516. For this simulation, parent light source 516 was an external cavity laser (ECL) having a narrow linewidth less than 50 kHz, and 15 dBm output power. In this experiment, phase modulator 510 had a 3-dB bandwidth of 20 GHz and a Vpi less than 3 V. A QPSK signal was generated by driving phase modulator 510 with the 12.5-GBaud PAM-4 signal from AWG 508.

An output QPSK signal from phase modulator 510 was then amplified by an amplifier 916 (a booster erbium-doped fiber amplifier (EDFA), for this experiment) for transmission over optical communication medium 506. A variable optical attenuator (VOA) 520, disposed along optical communication medium 506 between transmitter end 502 and receiver end 504 adjusted the received optical power and the optical signal to noise ratio (OSNR) of the output QPSK signal from transmitter end 502.

At receiver end 504, the power of the transmitted signal was measured from the output of VOA 520, at the input of receiver end 504 for coherent detection of the received QPSK signal, which was then (i) amplified by a pre-EDFA 522, (ii) input to an integrated coherent receiver (ICR) 524 in operable communication with a local oscillator (LO) source 526, (iii) sampled by a digital sampling oscillator (DSO) 528 (also 80 GSa/s, in this test setup), and (iv) processed by a MATLAB-capable computer (PC) 530. In this text example, the amplified QPSK optical signal from pre-EDFA 522 was mixed with the LO signal from LO source 526 at the same wavelength and then detected by ICR 524. Obtained radio frequency (RF) signals for the respective I/Q components of the detected signal were then sent into an optical modulation analyzer of DSO 528 acquired at 80 GS/s, and then processed offline by PC 530 using a MATLAB program.

For this experimental setup of test architecture 500, the offline DSP code of the MATLAB program used a standard coherent DSP technique that included signal resampling and orthogonalization, chromatic dispersion (CD) compensation, clock recovery, polarization demultiplexing and equalization, carrier frequency offset (CFO) compensation, and carrier phase recovery (CPR). In practical applications, such functionality may be performed within the coherent receiver (e.g., ICR 524) itself, or by a DSP unit thereof. Thus, for this experimental setup of test architecture 500, the reduced-complexity CPE/CPR techniques described above with respect to FIG. 4 were implemented to demodulate the transmitted signal through the MATLAB offline process employed by PC 530. As described further below with respect to FIG. 6, the two-stage CPE processing techniques described above may be advantageously incorporated into the CPR processing performed at the receiver end (e.g., receiver end 504). Results obtained from this incorporation into the experimental setup of test architecture 500 are described further below with respect to FIG. 7.

Figure 6:
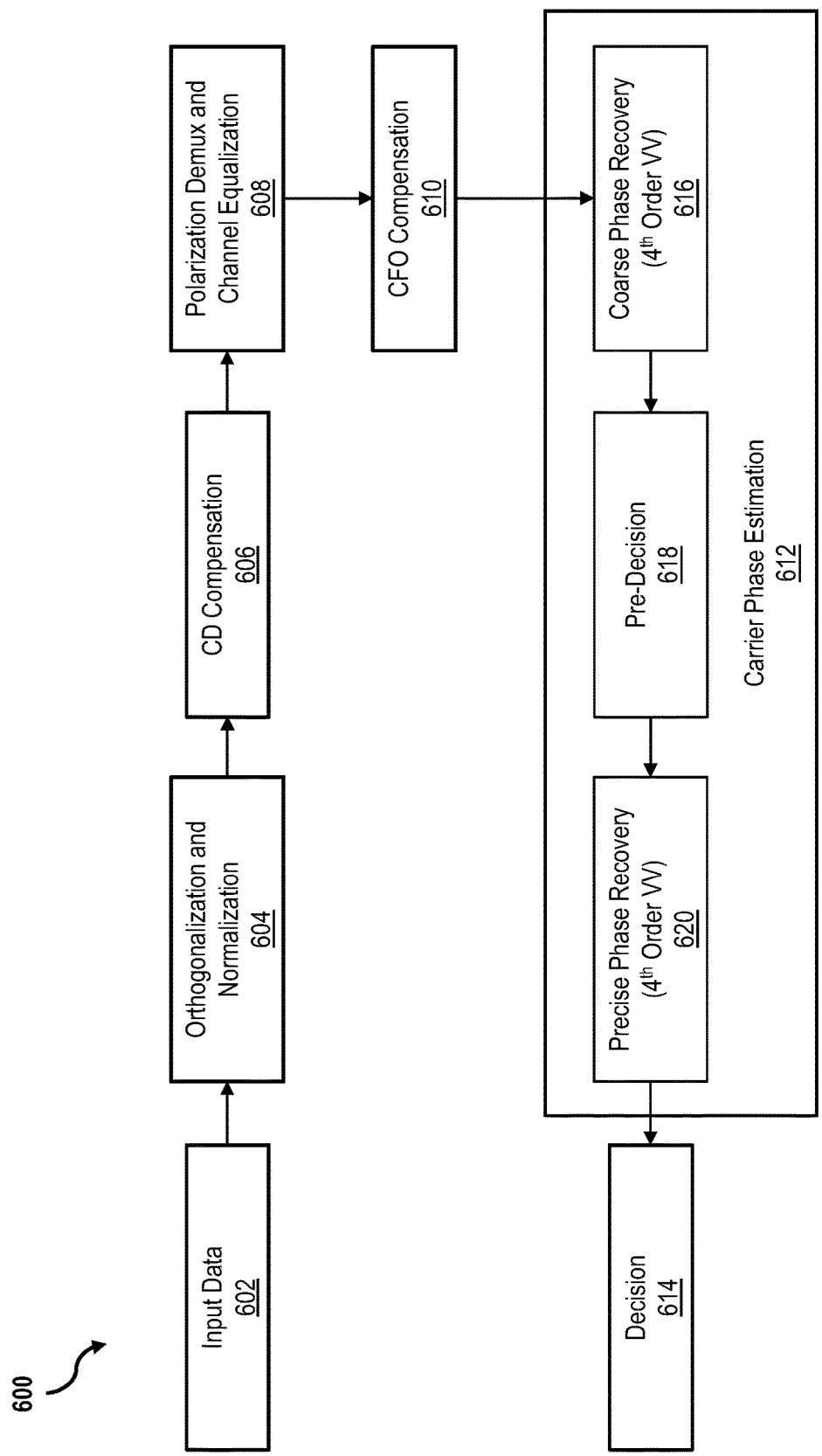
FIG. 6 is a graphical illustration depicting an exemplary coherent signal recovery process, in accordance with an embodiment.

FIG. 6 is a graphical illustration depicting an exemplary coherent signal recovery process 600. In the exemplary embodiment depicted in FIG. 6, signal recovery process may include some conventional signal processing steps to process received input data 602, including an orthogonalization and normalization step 604, a CD compensation step 606, a polarization demultiplexing and channel equalization step 608, and a CFO compensation step 610. CFO compensation step 610 is then followed by a CPE subprocess 612, and then a decision step 614 based on the output from CPE subprocess 612. CPE subprocess 612 differs from conventional CPE processing techniques in that CPE subprocess includes a first stage coarse phase recovery step 616, a second stage pre-decision step 618, and a third stage precision phase recovery step 620.

In an exemplary embodiment, first stage coarse phase recovery step 616 may be similar to first subprocessing stage 402 of process 400, FIG. 4, and implement a fourth order VV algorithmic technique on the output from CFO compensation step 610. Signal recovery process 600 may thus perform one or more of steps 604, 606, 608, and 610 between receiving input data in step 602, and coarse phase recovery processing in step 616. It may be noted that, although such interim steps are not expressly described with respect to process 400, FIG. 4, the person of ordinary skill in the art will understand that such additional steps are not excluded from process 400 either. Unless otherwise described to the contrary, steps 604, 606, 608, and 610 may be performed in a different order, or one or more of such steps may be performed simultaneously.

Further to the exemplary embodiment, second stage pre-decision step 618 may be similar to pre-decision step 406 of process 400, FIG. 4, and third stage precision phase recovery step 620 may be similar to second subprocessing stage 404. As described above, the multi-stage CPE processing techniques illustrated with respect to signal recovery process 600 are described with respect to VV algorithmic techniques by way of example, and not in a limiting sense. Other CPE algorithmic techniques (e.g., BPS, etc.) may be implemented for CPE subprocess 612 without departing from the scope herein.

Figure 7:
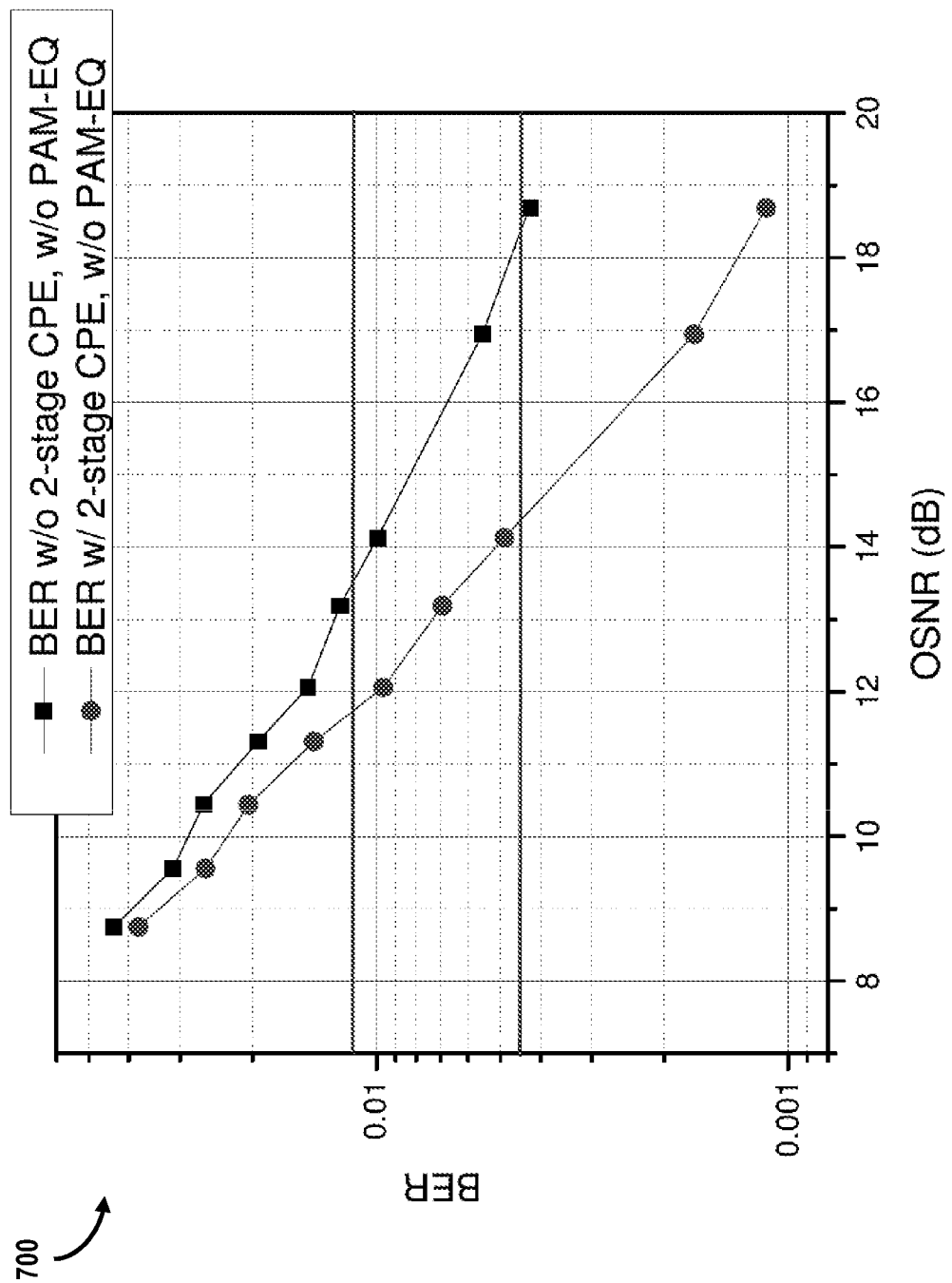
FIG. 7 is a graphical illustration of a comparative plot of bit error rate against received optical signal to noise ratio according to the coherent signal recovery process depicted in FIG. 6.

FIG. 7 is a graphical illustration of a comparative plot 700 of bit error rate (BER) against received OSNR according to coherent signal recovery process 600, FIG. 6. More particularly, plot 700 illustrates OSNR test results obtained from test architecture 500, FIG. 5 (i.e., measured at the input to ICR 524, plotted against BER obtained by incorporating signal recovery process 600 into the processing at receiver end 504 of test architecture 500. In this embodiment, plot 700 compares the BER-vs-OSNR results for a PAM-4 (QPSK) signal after coherent detection that does not incorporate signal recovery process 600 (square dot sub-plot, e.g., conventional coherent DSP with single-stage CPE), against the BER-vs-OSNR results for the same PAM-4/QPSK signal where signal recovery process 600 is incorporated into the DSP of receiver end 504 (circle dot sub-plot, e.g., coherent DSP implementing the present multi-stage CPE techniques).

As can be seen from the comparative example depicted in FIG. 7, significant OSNR performance improvements are observable by incorporating the two-stage CPE processing techniques described above with respect to FIGS. 4 and 6. That is, in comparison with conventional coherent DSP techniques, the test results obtained from incorporation of the present multi-stage CPE embodiments into test architecture 500, FIG. 5, greatly improved the performance of the coherent signal generated by the phase domain coherent signal transmitter (e.g., transmitter end 502, FIG. 5). For example, at the staircase hard-decision (HD) forward error correction (FEC) threshold (i.e., BER=4.5E-3) of comparative plot 700, it may be observed that incorporation of the present two-stage CPE techniques (e.g., process 600, FIG. 6) demonstrates approximately a 4 dB improvement in OSNR performance compared with the conventional single-stage CPE coherent DSP. Additionally, at the concatenated soft-decision (SD) FEC threshold (i.e., BER=1.2E-2), incorporation of the present two-stage CPE techniques still demonstrates an approximately 1.7 dB improvement in OSNR performance. It may be noted that separate post-processing phase domain equalization (described further below with respect to FIG. 9) was not performed to produce the results of either sub-plot of comparative plot 700.

As referenced above, co-pending U.S. patent application Ser. No. 17/077,906 introduced several phase domain equalization techniques that improve the performance of a phase modulator-based coherent transmitter, including innovative post-equalization techniques for remapping phase signals to PAM-4 signals, as well as applied phase domain equalization to mitigate the impact of phase noise introduced by ISI. As described below with respect to FIG. 8, these innovative post-processing may be implemented in a DSP flow together with the present multi-stage CPE techniques in a complementary fashion.

Figure 8:
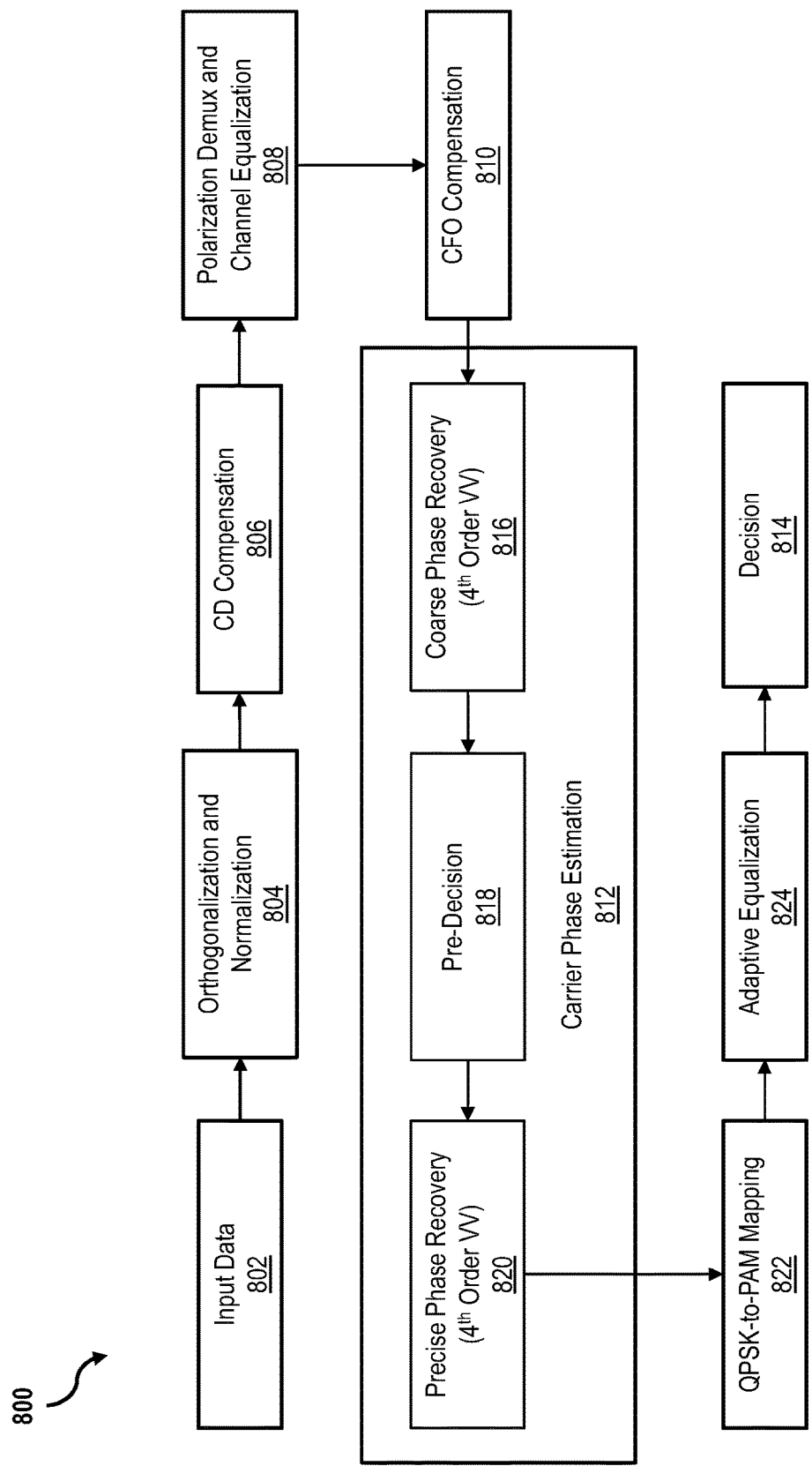
FIG. 8 is a graphical illustration depicting an alternative coherent signal recovery process, in accordance with an embodiment.

FIG. 8 is a graphical illustration depicting an alternative coherent signal recovery process 800. In the exemplary embodiment depicted in FIG. 8, signal recovery process 800 is similar to signal recovery process 600, FIG. 6, and, after receiving input data in step 802, may similarly include one or more of an orthogonalization and normalization step 804, a CD compensation step 806, a polarization demultiplexing and channel equalization step 808, and a CFO compensation step 810 followed by a multi-stage CPE subprocess 812 leading to a decision step 814. In this embodiment, CPE subprocess 812 may be substantially similar to CPE subprocess 612, FIG. 6, and include a first stage coarse phase recovery step 816, a second stage pre-decision step 818, and a third stage precision phase recovery step 820.

In an exemplary embodiment, instead of decision step 814 being based directly on the output of CPE subprocess 812, the output of CPE subprocess 812 (i.e., from third stage precision phase recovery step 820) is first subject to post-processing by one or more of a QPSK-to-PAM remapping step 822 and an adaptive equalization step 824. That is, in the exemplary DSP flow depicted in FIG. 8, the multi-stage CPE algorithmic techniques described above with respect to FIGS. 4 and 6 may be incorporated in a carrier phase recovery stage (i.e., CPE subprocess 812) before performing QPSK-to-PAM post-processing remapping (i.e., QPSK-to-PAM remapping step 822). It may thus be further noted that, although such post-processing steps are not expressly described with respect to signal recovery process 600, FIG. 6, the person of ordinary skill in the art will understand that such additional steps are not excluded from process 600 either. Unless otherwise described to the contrary, the various steps of process 800 may be performed in a different order, or one or more of such steps may be performed simultaneously.

Figure 9:
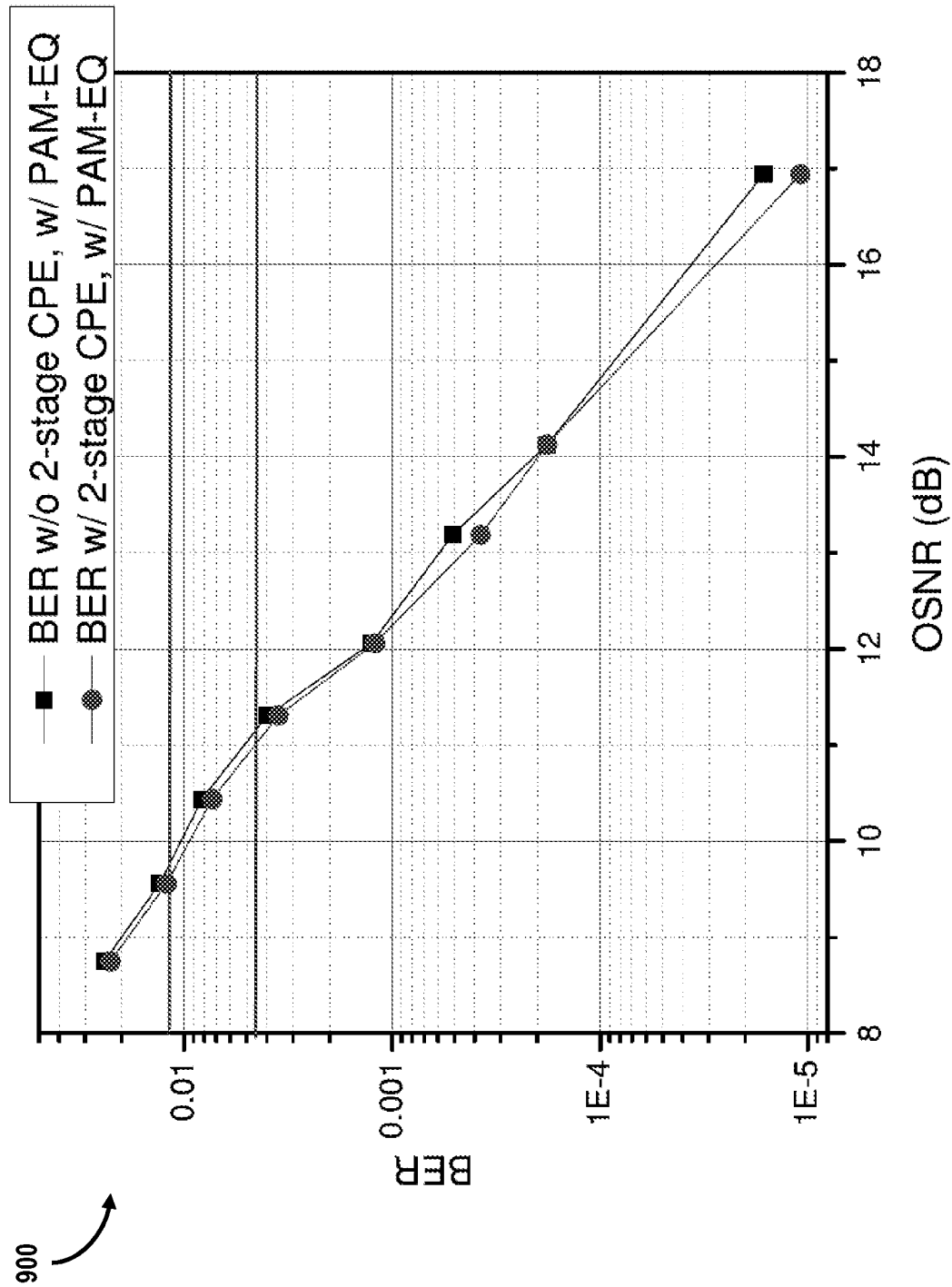
FIG. 9 is a graphical illustration of a comparative plot of bit error rate against received optical signal to noise ratio according to the coherent signal recovery process depicted in FIG. 8.

FIG. 9 is a graphical illustration of a comparative plot 900 of BER against received OSNR according to coherent signal recovery process 800, FIG. 8. More particularly, comparative plot 900 is similar to comparative plot 700, FIG. 7, and similarly illustrates BER-vs-OSNR test results obtained both with (circle dot sub-plot), and without (square dot sub-plot), incorporation of signal recovery process 800 into receiver end 504 of test architecture 500, FIG. 5. Different though, from comparative plot 700, comparative plot 900 illustrates comparative test results that further implement phase domain post equalization for the phase domain coherent signal transmitter described herein.

As can be seen from comparative plot 900, although performance using the conventional single-stage DSP techniques improves by incorporating the post-processing techniques of co-pending U.S. patent application Ser. No. 17/077,906, the performance results are improved even more significantly by additionally implementing the complementary multi-stage CPE techniques described herein. For example, at both the staircase HD-FEC threshold (i.e., BER=4.5E-3) and the concatenated SD-FEC threshold (i.e., BER=1.2E-2), incorporation of the present two-stage CPE techniques demonstrates an approximately 0.15 dB improvement in OSNR performance in comparison with the use of the conventional single-stage CPE.

According to the systems and methods described herein, an innovative multi-stage CPE technique may be readily incorporated, in a complementary fashion, into newer or conventional DSP techniques for signal recovery of a phase domain coherent signal transmitter. Whether implemented as a standalone process or a complementary subprocess to conventional CPE/CPR techniques, the present embodiments are demonstrated above to significantly improve the performance of the system. Moreover, and as also demonstrated above, the present multi-stage CPE techniques may also be readily incorporated with newer post-processing techniques introduced by the present inventors for phase domain equalization of the phase domain coherent signal transmitter, which, in combination, achieve still further system performance improvements.

Exemplary embodiments of CPR and CPE systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments herein may be implemented and utilized in connection with other signal processing and signal recovery algorithms or techniques.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general-purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A receiver for processing an input signal from a communication network, comprising:
   a processor; and
   a memory configured to store computer executable instructions, which, when executed by the processor, cause the processor to:
      receive an input data signal including digital bit information;
      code the input data signal into a plurality of multi-level symbols;
      map the plurality of multi-level symbols into a plurality of constellation points in the phase domain;
      execute a first phase recovery subprocess on the plurality of constellation points to recover a first carrier phase of the input signal;
      implement a Gaussian mixture model (GMM) algorithm on the recovered first carrier phase;
      obtain, after implementation of the GMM algorithm, an enhanced recovered carrier phase; and
      process the enhanced recovered carrier phase with a second phase recovery subprocess to reduce distortion from the input signal.

2. The receiver of claim 1, wherein the plurality of multi-level symbols represents a multi-level pulse amplitude modulation (PAM-N) signal.

3. The receiver of claim 2, wherein the plurality of constellation points represents a quadrature phase shift keying (QPSK) coherent signal.

4. The receiver of claim 2, wherein the first phase recovery subprocess includes a Viterbi to Viterbi (VV) algorithm.

5. The receiver of claim 4, wherein the VV algorithm is a fourth order VV algorithm, and wherein the PAM-N signal is a PAM-4 signal.

6. The receiver of claim 5, wherein the instructions further cause the processor to estimate random phase noise by taking the fourth power of a phase shift from the plurality of constellation points.

7. The receiver of claim 6, wherein the instructions further cause the processor to recover the first carrier phase of the input signal by multiplying the reverse of an average estimated phase change to each data block of the estimated random phase noise.

8. The receiver of claim 4, wherein the second phase recovery subprocess includes at least one of a VV algorithm and a blind phase search (BPS) algorithm.

9. The receiver of claim 2, wherein the first phase recovery subprocess includes a blind phase search (BPS) algorithm.

10. The receiver of claim 1, wherein the GMM algorithm is configured to classify the plurality of mapped multi-level symbols of the respective plurality of constellation points with an estimated cluster index in the phase domain.

11. The receiver of claim 1, comprising a coherent optics receiver.

12. The receiver of claim 11, wherein the coherent optics receiver is an integrated coherent receiver (ICR).

13. The receiver of claim 11, wherein the input signal is received from a remote phase modulator-based coherent transmitter of the communication network.

14. A method of performing carrier phase recovery on an input digital signal from a remote phase modulator-based coherent transmitter, comprising the steps of:
   mapping the input digital signal into a plurality of mapped symbols;
   performing coarse phase recovery on the plurality of mapped symbols to recover a coarse carrier phase from constellation points of the plurality of mapped symbols;
   classifying, after the step of performing, phase domain symbols of the plurality of mapped symbols with an estimated cluster index;
   generating, from the classified phase domain symbols, a plurality of constellation clusters in the phase domain; and
   performing fine phase recovery on the plurality of constellation clusters to obtain a precision phase recovery signal.

15. The method of claim 14, further comprising one or more pre-recovery steps executed on the input digital signal prior to the step of performing coarse phase recovery.

16. The method of claim 15, wherein the one or more pre-recovery steps include at least one of orthogonalization and normalization, chromatic dispersion (CD) compensation, polarization demultiplexing and channel equalization, and carrier frequency offset (CFO) compensation.

17. The method of claim 14, further comprising one or more post-processing steps executed on the precision phase recovery signal after the step of performing fine phase recovery.

18. The method of claim 17, wherein the one or more post-processing steps includes a remapping step.

19. The method of claim 18, wherein the input digital signal includes a pulse amplitude modulation (PAM) signal, wherein the plurality of constellation clusters includes a quadrature phase shift keying (QPSK) coherent signal, and wherein the remapping step comprises QPSK-to-PAM remapping.

20. The method of claim 17, wherein the one or more post-processing steps includes an adaptive equalization step.

* * * * *